United States Patent [19]

Carroll

[11] Patent Number: 4,657,275
[45] Date of Patent: Apr. 14, 1987

[54] SELF-ALIGNING TRAILER HITCH

[76] Inventor: Gordon L. Carroll, 2143 S. Minneapolis, Wichita, Kans. 67211

[21] Appl. No.: 849,215

[22] Filed: Apr. 7, 1986

[51] Int. Cl.$^4$ ............................................. B60D 1/06
[52] U.S. Cl. ..................................... 280/477; 280/511
[58] Field of Search .................. 280/477, 406 A, 489, 280/495, 504, 507, 508, 511, 512, 514, 478 A, 478 B, 479 A, 400, 402

[56] References Cited

U.S. PATENT DOCUMENTS

| 1,626,993 | 5/1927 | Williams | 280/477 |
| 3,588,145 | 6/1971 | Thompson | 280/477 X |
| 3,773,356 | 11/1973 | Eichels et al. | 280/477 |
| 4,226,438 | 10/1980 | Collins | 280/477 |
| 4,417,748 | 11/1983 | Dortch | 280/477 |

FOREIGN PATENT DOCUMENTS

| 70319 | 4/1959 | France | 280/508 |
| 328634 | 4/1958 | Switzerland | 280/477 |

Primary Examiner—John J. Love
Assistant Examiner—Mitchell J. Hill
Attorney, Agent, or Firm—Edward L. Brown, Jr.

[57] ABSTRACT

A self-aligning ball and socket type hitch including an elevated ramp member pivotally attached to an extension member which in turn is slidably engaged with the base of the hitch so that the ramp member and extension may be readily removed once the ball and socket are engaged. The ramp member includes a pair of converging sidewalls defining an adjustable width end opening therebetween and the rearward edge of the ramp member includes a slot for passage of the ball when the ramp member pivots out of position below the ball; and a support leg pivotally supported on the base member including a catch for supporting the rear edge of the ramp member in a canted position above the ball whereby engagement of the support leg with the trailer tongue and rotation of the support leg releases the ramp member for rotation about its pivoted connection with the extension member allowing it to drop to a horizontal position as the socket on the tongue engages the ball.

9 Claims, 5 Drawing Figures

SELF-ALIGNING TRAILER HITCH

BACKGROUND OF THE INVENTION

The present invention is directed towards ball type trailer hitches and more particularly to a self-aligning hitch which will align and engage the ball by merely backing the towing vehicle into engagement with the tongue member of the trailer.

Self-aligning hitches have been available for the semi-truck type hitch for many years. However, the conventional ball and socket hitches utilized on pickup trucks and smaller trailers have not had self-aligning devices of any commercial significance.

In the U.S. Pat. to Collins No. 4,226,438 and the U.S. Pat. to Eichels No. 3,773,356, the broad concept of tapered sidewalls is taught. Neither of these patents provide a removable ramp means for supporting and lifting the tongue over the ball.

In the U.S. Pat. to Thompson No. 3,588,145, the general concept of a lifting ramp with tapered sidewalls for laterally aligning the hitch over the ball is taught in FIGS. 13 through 17, and 39 and 40.

Most commercial hitches have always utilized a ball and socket connection wherein the ball is mounted in an upstanding manner on the towing vehicle with the inverted socket on the tongue trailer. Trailers which have carried light tongue weights are not difficult to attach to the ball, since they can be easily lifted manually and guided over to engagement with the ball. However, trailers with higher tongue loads are very difficult to manually attach to a stationary towing vehicle, but rather require the towing vehicle to maneuver the ball precisely under the stationary inverted socket of the tongue and then lower the tongue into engagement with the ball through the use of a screw jacket or similar device. When an individual attempts this alignment process by himself, it becomes very difficult since he cannot see from the driver's seat the alignment of the tongue and ball. In the last-mentioned patent to Thompson, a somewhat similar device to the present invention is utilized wherein a ramp means having tapered sidewalls is provided to lift and guide the trailer tongue into position over the ball, whereupon further movement of the tongue releases a locking pin and allows the ramp to drop so that the socket of the tongue engages the ball.

SUMMARY OF THE PRESENT INVENTION

The present invention is a self-aligning hitch in a simplified form which allows the tongue of the trailer to be lifted and laterally aligned over the ball as the towing vehicle is backed towards the trailer. When the tongue contacts the support leg and begins to rotate it, the support leg releases the ramp member, allowing it to fall downward as the aligned tongue socket engages the ball. The ramp means and extension member can then be removed from the hitch base so that the tongue of the trailer and the hitch base are free to rotate relative to each other. Certain trailer tongues severely crowd the hitch ball and base on the towing vehicle and do not provide room for a rearwardly extending ramp means once the towing vehicle is in its pulling mode.

Therefore the principal object of the present invention is to provide a ball and a socket hitch structure which is self-aligning and engaging by merely backing the towing vehicle into the trailer.

Another object of the present invention is to provide a self-aligning and engaging ball and socket hitch structure wherein the ramp means is readily removable from the hitch once the ball and socket are engaged.

Another object of the present invention is to provide a self-aligning ball and socket hitch structure which is simple in construction and design.

DESCRIPTION OF THE PREFERRED EMBODIMENT

Figure 1:
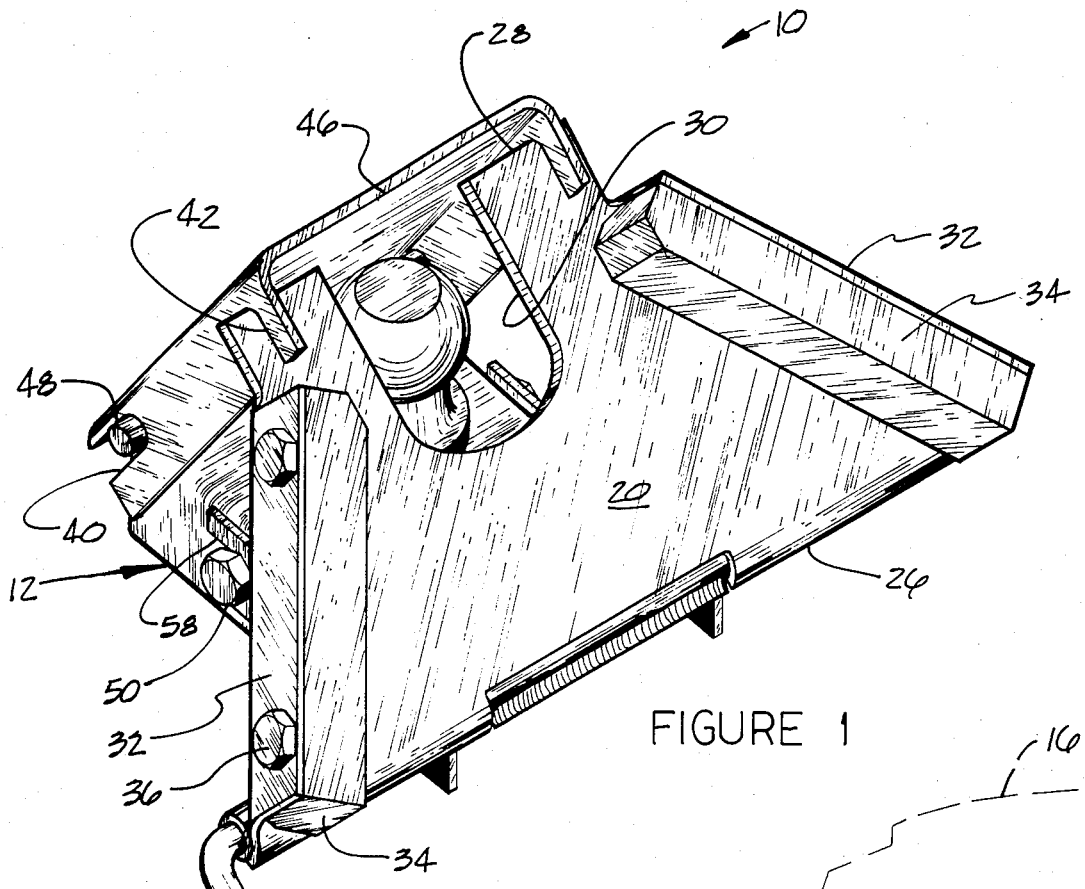
FIG. 1 is a perspective view of the self-aligning hitch with the ramp in position for lifting and engaging the tongue of the trailer.
Figure 2:
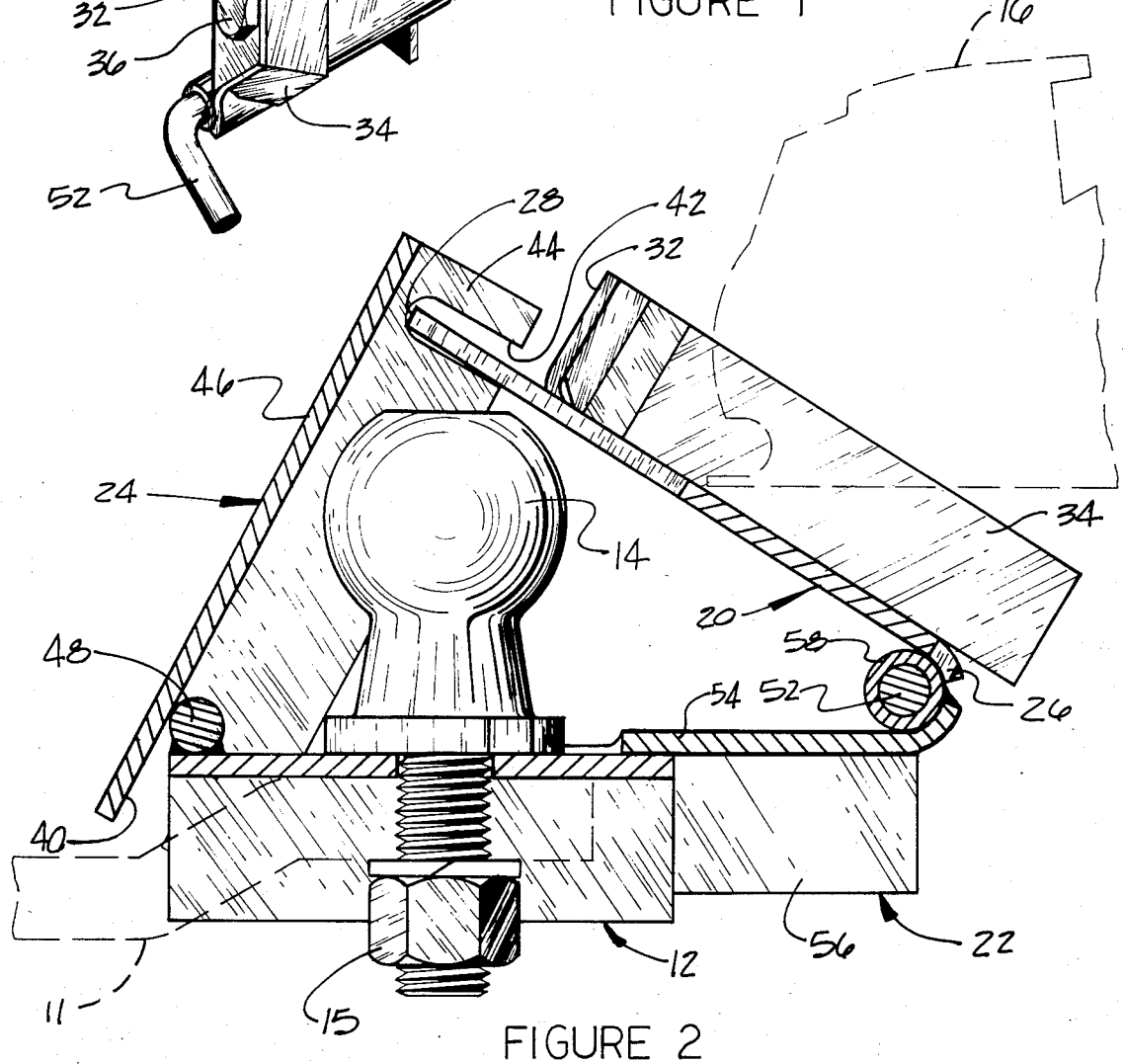
FIG. 2 is a longitudinal elevational section through the center of the hitch structure, with the tongue of the trailer shown in dotted line riding up the ramp member.
Figure 3:
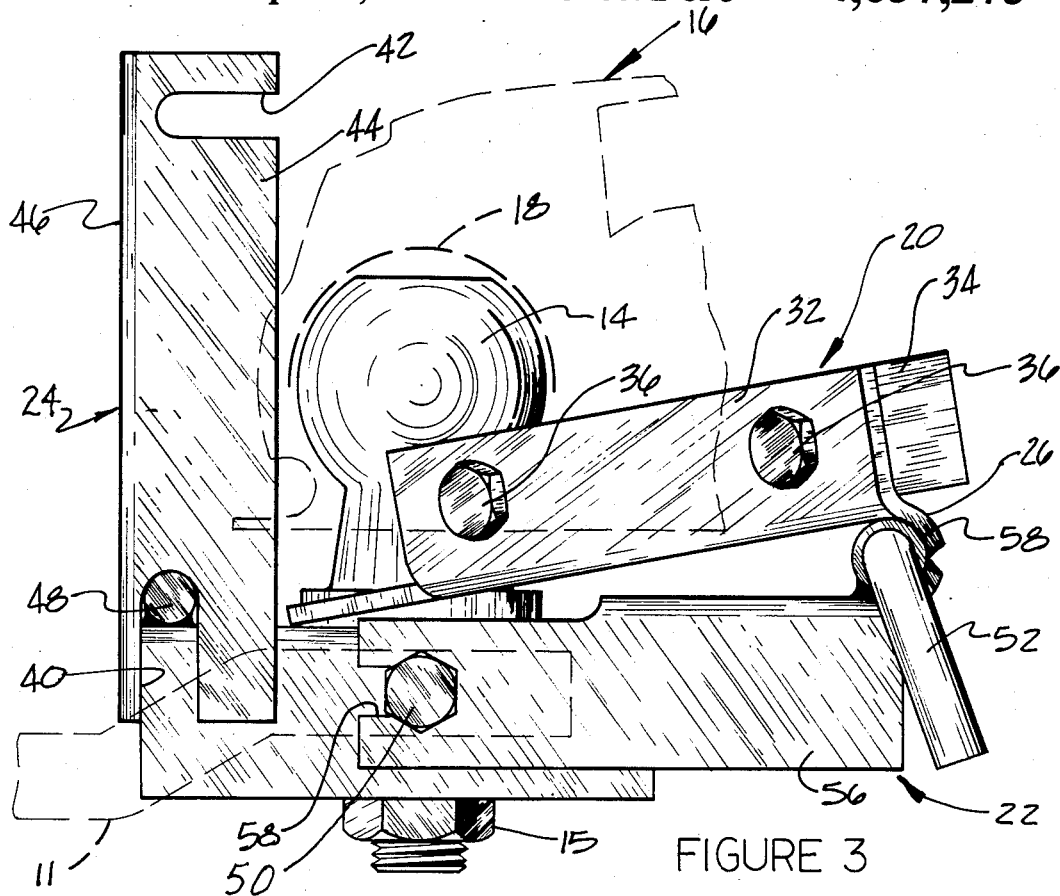
FIG. 3 is a similar longitudinal section to FIG. 2 with the ramp member pivoted downward and the socket of the tongue in engagement with the ball.

Referring to FIGS. 1 and 2, the self-aligning hitch, generally described by reference numeral 10, is shown attached to a conventional drawbar 11 which in turn is connected to the frame of the towing vehicle. The hitch 10 comprises a ball member 14 threadably attached to a base member 12 by nut and washer 15. Slidably positioned over base member 12 is an extension member 12 which slides horizontally into engagement with a pair of engagement pins and bolts 50, as best seen in FIG. 3. The extension member 22 is channel-shaped with a portion of the web 54 cutaway to allow passage of the ball 14 while the two flanges 56 of the extension member 22 each include a slot 58 on the end thereof for receipt of engagement pins 50, as seen in FIG. 3. The extension member 22 provides an offset hinge joint 60 for ramp member 20 with a removable hinge pin 52.

Figure 4:
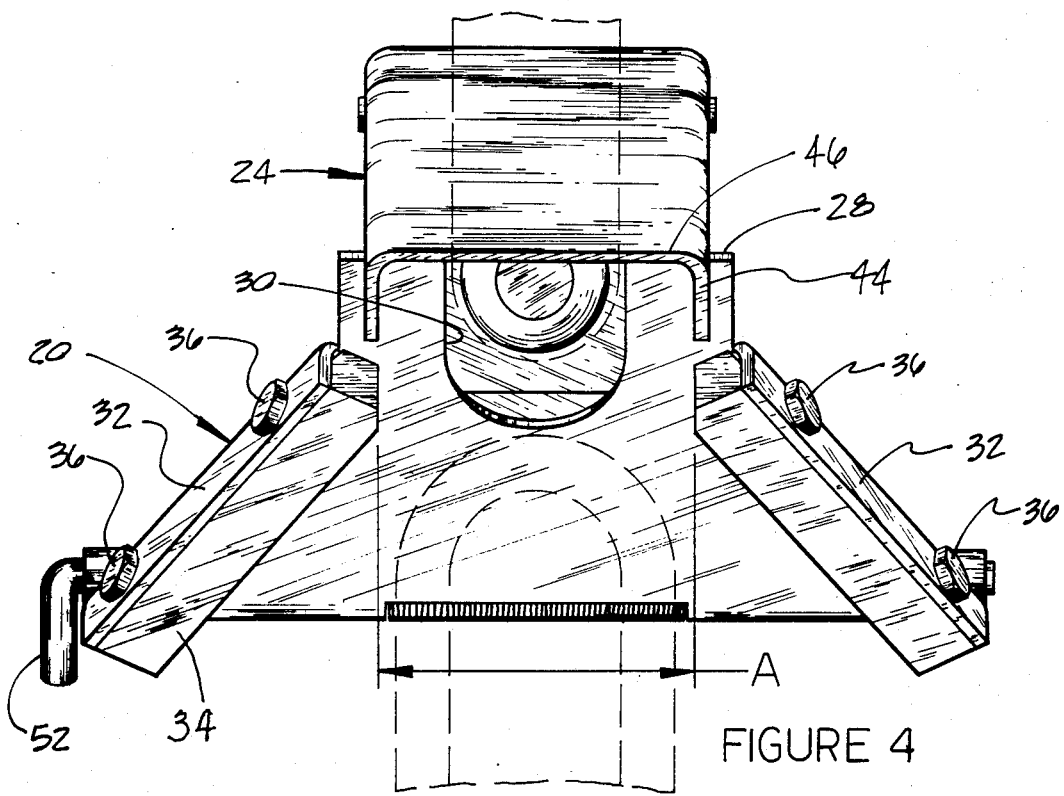
FIG. 4 is a top view of the self-aligning hitch illustrating the tongue member in dotted line.

Ramp member 20 has a pair of upstanding sidewalls 32 which from the forward edge 26 of the ramp converge to a point where they define an end opening A, as seen in FIG. 4, which is the approximate width of the trailer tongue 16.

The ramp member 20 is held in its canted position, as seen in FIG. 2, by a support leg 24 having a catch or notch 42 which engages the rearward edge 28 of the ramp member 20. When the tongue 16 riding up the ramp member 20, engages the web portion 46 of the support leg 24, leg 24 begins to pivot in a counterclockwise direction until catch 42 releases the edge 28 of the ramp member, whereupon the ramp member 20 falls to its FIG. 3 position and the socket 18 of tongue 16 engages ball 14. Support leg 24 is also formed from a channel section, as best seen in FIG. 4, wherein the web portion 46 acts as a contact surface for the tongue 16. The leg 24 also includes flanges 44 which incorporate a pair of slots 40 for pivotally engaging pivot pin 48 while the upper ends of flanges 44 include a pair of catches or notches 42 for engaging and supporting the rear edge 28 of ramp member 20.

Removably attached to sidewalls 32 are a pair of spacer members 34, as seen in FIGS. 1 through 4, which define the end opening A for receipt of a particular width trailer tongue. Thinner spacer members, not shown in the drawings, or no spacer members at all, can provide a varying width end opening to accommodate whatever the width of the trailer tongue might be. The particular shape of the corner surface 35 of the spacer members can also be altered to vary the width of end opening A.

Figure 5:
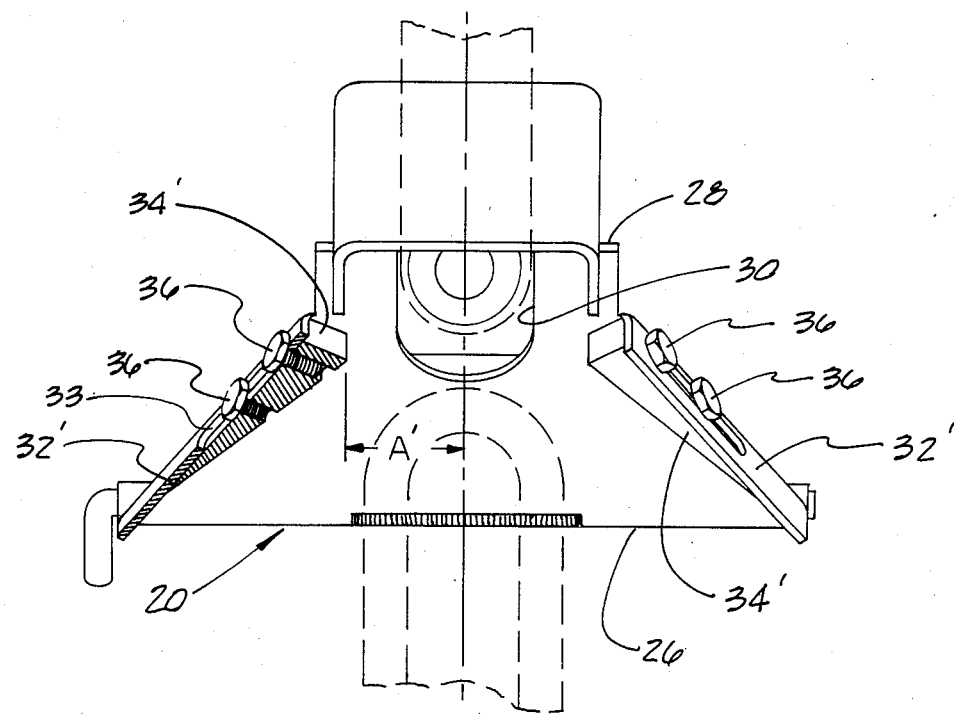
FIG. 5 is a top plan view of a modified form of the ramp member.

A modified form of spacer member is illustrated in FIG. 5 by a pair of wedge-shaped blocks 34', which are attached to sidewalls 32 by a pair of bolts 36. Bolts 36 pass through a longitudinal slot 33, which when loosened allows the blocks 34' to be moved relative to the sidewall 32 so as to vary the end opening A'.

OPERATION

Attempting to a load a conventional ball and socket trailer hitch which has a tongue weight heavier than one man can lift becomes very tedious and difficult to accomplish, particularly with one person. First, the tongue of the trailer must be lifted to a position above the ball, and then the ball which is attached to the towing vehicle must be maneuvered to a position directly under the hitch socket by the driver of the towing vehicle, which is a very difficult thing to do since the driver cannot see the alignment of the socket and ball. Once this alignment is obtained, then the tongue, through the use of a conventional screw jack, can be lowered into engagement with the ball.

In the present invention, all of this can be achieved by a single operator who backs the towing vehicle into rough alignment with the trailer tongue, as seen in FIGS. 2 and 4. As the tongue 16 comes in contact with the ramp member 20, as seen in FIG. 2, the tongue 16 is lifted upward as the towing vehicle backs toward the trailer. The lateral alignment of the tongue 16 is effected by the upstanding sidewalls 32 which converge toward the rear of the ramp member, thus aligning the tongue socket longitudinally with ball 14. As tongue 16 contacts the web portion 46 of the support leg, it causes support leg 24 to rotate in a counterclockwise direction until catch 42 releases the rearward edge 28 and the ramp member 20 drops down to the FIG. 3 position while the tongue socket 18 engages ball 14. With the tongue 16 now resting on ball 14, the ramp member 20, extension member 22 and support leg member 24, can all be removed from the hitch. This is accomplished by removal of hinge pin 52, thus disconnecting the ramp member 20 from its pivoted extension member 22, and then sliding extension member 22 horizontally to the right, as seen in FIG. 3, until engagement pins 50 are released by slots 58. Support leg member 24 is removed from the hitch by merely lifting the member 24 upwardly so that slots 40 disengage from pivot pin 48. With the various self-aligning members of the hitch now removed, hitch base 12 is unencumbered so that the hitch connection is free to move into various positions and the tongue 16 of the trailer is unencumbered.

If the width of tongue 16 is greater than that illustrated in the FIG. 4 showing, thinner spacer members 34 can be utilized or a spacer member 34', as shown in FIG. 5, can likewise be used. In the FIG. 5 embodiment of the present invention, the spacer member 34' is a wedge-shaped block which slides in a slot 33 in the sidewall 32', and can be adjustably positioned to the necessary tongue width by the release of bolts 36.

While this invention has been described fully and completely with special emphasis upon a preferred embodiment which represents the best mode of carrying out the invention, it should be understood that within the scope of the appended claims the invention may be practiced otherwise than is specifically described and shown herein.

I claim:

1. A self-aligning hitch attached to the drawbar of a towing vehicle for lifting and aligning the trailer tongue to the ball of the hitch comprising:

a base member having a conventional upstanding ball thereon;

an extension member removably overlaying the base member and having an offset end;

a ramp member with forward and rearward edges positioned over the extension member and pivotally attached to the offset end of the extension member, the ramp member having a pair of converging sidewalls defining an adjustable width end opening therebetween, the rearward edge of the ramp member including a slot for passage of the ball;

support leg means pivotally supported on the base member including a catch supporting the rearward edge of the ramp member in a canted position above the ball member whereby engagement of the support leg means with the trailer tongue and rotation of the support leg means releases the ramp member, allowing it to drop to a horizontal position under the weight of the tongue as the tongue socket engages the ball.

2. A self-aligning hitch as set forth in claim 1, including spacer members removably attached to the sidewalls of the ramp to vary said end opening to accommodate different width trailer tongues.

3. A self-aligning hitch as set forth in claim 1, including spacer members removably attached to the sidewalls of the ramp, the spacer members comprising a longitudinal block having a constant width whereby the width of said end opening can be varied by the use of different width blocks.

4. A self-aligning hitch as set forth in claim 1, including spacer members removably attached to the sidewalls of the ramp, the spacer members comprising wedge-shaped blocks and attachment means for attaching the blocks to the sidewalls at various longitudinal positions on the sidewalls.

5. A self-aligning hitch as set forth in claim 1, including spacer members removably attached to the sidewalls of the ramp to vary the end wall opening, the spacer members including wedge-shaped blocks, each sidewall including a longitudinal slot and bolt means for attaching said blocks to said sidewalls through said slots.

6. A self-aligning hitch as set forth in claim 1, wherein the extension member comprises a section of channel with a portion of the web cut away to allow passage of the ball, and the two flanges of the channel having slotted ends which engage the base member to prevent the extension member from tilting under load.

7. A self-aligning hitch as set forth in claim 1, wherein the support leg means comprises a channel section wherein the web portion of the channel provides a contact surface for the trailer tongue and the flange sections of the channel include a pair of notches at one end thereof, for pivotally mounting the leg means on the base and a pair of catches at the opposite end for releasably supporting the ramp member.

8. A self-aligning hitch as set forth in claim 1, wherein the extension member comprises a section of channel with a portion of the web cut away to allow passage of the ball, and the two flanges of the channel having slotted ends which engage a pin on the base member to prevent the extension member from tilting under load and the support leg means comprises a channel section wherein the web portion of the channel provides a contact portion for the trailer tongue and the flange sections of the channel include a pair of notches at one end thereof for pivotally mounting the support leg means on the base and a pair of catches at the opposite end for releasably supporting the ramp member.

9. A self-aligning hitch as set forth in claim 1, including a hinge joint between the forward edge of the ramp member and the extension member including removable pin means for disassembling the hinge which allows the ramp and extension member to be removed from the hitch once the trailer tongue is in position on the ball.

* * * * *